United States Patent [19]

Seiler

[11] Patent Number: 5,369,961
[45] Date of Patent: Dec. 6, 1994

[54] APPARATUS FOR THE DEFROSTING OF REFRIGERATING DRIERS BELOW 0 DEGREES CELSIUS

[76] Inventor: Wolfram Seiler, Dürerstrasse 17, D-4040 Neuss 1, Germany

[21] Appl. No.: 965,355

[22] Filed: Oct. 23, 1992

[30] Foreign Application Priority Data

Oct. 31, 1991 [DE] Germany .............................. 4135887

[51] Int. Cl.$^5$ ............................................. B01D 53/26
[52] U.S. Cl. ........................................ 62/271; 62/434; 62/277; 34/284
[58] Field of Search .................. 62/434, 272, 277, 278, 62/279, 271; 34/5, 75

[56] References Cited

U.S. PATENT DOCUMENTS

| | | | |
|---|---|---|---|
| 2,481,348 | 9/1949 | Ringquist et al. | 62/278 |
| 2,613,513 | 10/1952 | Shields | 34/75 |
| 2,894,376 | 7/1959 | Kelley | 34/5 |
| 3,138,007 | 6/1964 | Friedman et al. | 62/278 |
| 3,150,498 | 9/1964 | Blake | 62/278 |
| 3,151,470 | 10/1964 | Quick | 62/278 |
| 3,234,753 | 2/1966 | Quick | 62/278 |
| 3,638,444 | 2/1972 | Lindahl | 62/81 |
| 3,788,093 | 1/1974 | Lauterbach | 62/200 |
| 4,660,384 | 4/1987 | Pallanch | 62/81 |
| 4,813,239 | 3/1989 | Olson | 62/81 |

*Primary Examiner*—Henry A. Bennet
*Assistant Examiner*—William C. Doerrle
*Attorney, Agent, or Firm*—Renner, Otto, Boisselle & Sklar

[57] ABSTRACT

An apparatus for the refrigerated drying of gases, more particularly of compressed air, has at least one gas supply system, with a refrigerating device which has a heat exchanger unit through which a refrigerant carrier is passed, a cooling assembly for cooling down the refrigerant to such a temperature that the liquid contained in the gas or the vapour contained in the gas is deposited in ice form, and a de-icing unit. In addition to a main gas supply system there is a further gas supply system which comprises the de-icing unit and to which hot refrigerant can be supplied from the main gas supply system wherein at least two de-icers are provided for the de-icing unit of which at least one can selectively undergo regeneration, and that downstream of the de-icer in the second gas supply system there is a collecting container which is connected to each of the de-icers and from which the refrigerant consumers can be supplied straightaway.

2 Claims, 1 Drawing Sheet

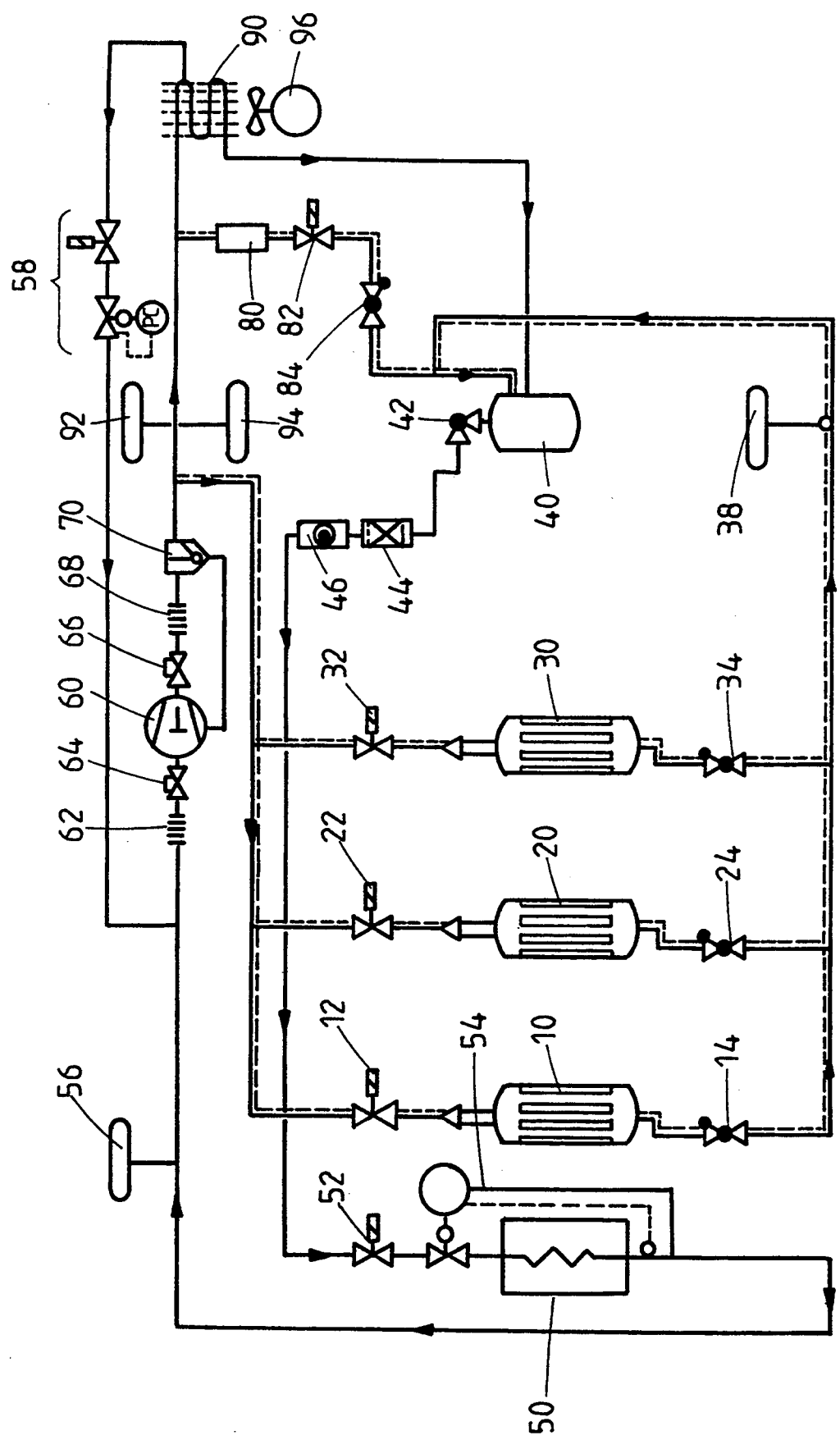

APPARATUS FOR THE DEFROSTING OF REFRIGERATING DRIERS BELOW 0 DEGREES CELSIUS

FIELD OF THE INVENTION

The invention relates to apparatus for the refrigerating drying of gases, more particularly compressed air, with at least one gas supply system, with a refrigerating unit which has a heat exchanger through which a refrigerant carrier is passed, a refrigerating assembly for cooling down the refrigerant to such a temperature that the liquid contained in the gas or the vapour contained in the gas is deposited in ice form, and a de-icing unit. More particularly the invention relates to apparatus for the defrosting of refrigerating driers below 0° Celsius.

BACKGROUND TO THE INVENTION

During compression, refrigerating machines produce hot gaseous refrigerants which are generally called hot gas refrigerants. In the condenser which is connected at the output side this refrigerant discharges a large part of its heat to the atmospheric air or to cooling water and thereby becomes liquid. It is expanded in an evaporator through expansion valves and thereby absorbs heat from an area which is to be cooled whereby it again becomes gaseous. This heating and cooling effect is utilized for example in air-conditioning systems wherein the condenser and evaporator are interchangeable in their function and either heat or cool on the same outer side.

Ice which stems from the dampness of the surrounding air deposited in the evaporator on the ribs or in the pipes. In order to remove the ice and heat up the components again hot-gas refrigerant is supplied to the iced-up components for a certain time inside the refrigerating cycle. The normal operating process is thereby interrupted. The refrigerant is then drawn in from the compressor and only then is ready again for renewed use as a refrigerant. The hot-gas refrigerant can also serve to regulate the pressure on the operating side of the unit whereby use is made of the fact that in the case of gases a change in temperature is also always associated with a corresponding change in pressure.

Heating up or mixing is solely undertaken within the standard cycle by changing over to other components or by redirection.

The problems described above occur to a greater extent in apparatus used for the refrigerating drying of gases whereby moisture is to be drawn off from a surrounding gas such as compressed air. There are particular difficulties where the pressure thaw point lies below 0° C. since then hoarfrost or ice forms on the components provided for dehumidifying. At low temperatures which are produced by cold brine or the refrigerant of a cooling assembly, this hoarfrost or ice attaches itself to the surfaces designed specifically for this purpose. After a greater or lesser length of service life this covering becomes so thick that it has to be removed for economy reasons or in order to maintain the efficiency of the apparatus.

An apparatus for the refrigerating drying of gases of the kind mentioned at the beginning is known from DE-A 39 41 713 whereby the removal of the ice crystals is carried out by heat shocks by means of electro impulses, by pressure shocks, for example by means of ultrasound, or by thawing processes. These are relatively expensive measures wherein in the case of thawing there are still the additional problems described in connection with the air-conditioning systems.

It is an object of the invention is to provide an apparatus for the refrigerating drying of gases wherein de-icing can be carried out in a simple way without interrupting the refrigerant production operation.

SUMMARY OF THE INVENTION

According to the invention a secondary gas supply system is provided in addition to a main gas supply system. This second gas supply system comprises the de-icing unit and is supplied with the hot refrigerant from the main gas supply system wherein at least two de-icers are provided for the de-icing unit whereby at least one of the de-icers can be selectively regenerated and furthermore downstream of the de-icers in the second gas supply system there is a collecting container from which each refrigerant consumer is fed in the system. The thawing process is thus carried out by means of the hot gas refrigerant without having to interrupt the refrigerant production operation. The cooled-down refrigerant is always available from the collecting container. Pressing back into the collecting container is then only possible when the drop in pressure during cooling condensation in the condenser corresponds to the pressure in the regenerative de-icer. At least two de-icers are necessary so that the operation of the apparatus can be maintained during regeneration. It is however advantageous to use arrangements with more than two de-icers; particularly if very wet media are to be dried it may for example be necessary to always have two or more de-icers ready for use whilst one or two more of the de-icers are regenerated.

It can be advantageous to supply an air-brine heat exchanger with hot refrigerant from the main gas supply system whereby the heat exchanger is connected at the outlet side to the collecting container. This avoids any drop in performance.

BRIEF DESCRIPTION OF THE DRAWINGS

The invention will now be explained in detail merely by way of example with reference to the accompanying drawing. The single FIGURE is a diagrammatic illustration of the refrigerating cycle for an apparatus according to the present invention.

DESCRIPTION OF THE PREFERRED EMBODIMENT

A refrigerant is supplied in a refrigerant cycle by an electromagnetically operated valve 52 and over a regulated path 54 to a heat exchanger 50 in which a part of its thermal energy is extracted from the secondary medium. The exhausted relaxed gaseous refrigerant emerging from the heat exchanger 50 then passes over a connecting element 62 and valve 64 into a compressor 60 where it is compressed to a predetermined pressure and then supplied under pressure again to the circuit via a further valve 66 and a further connecting element 68.

During normal operation of the apparatus the compressed and thus heated refrigerant is supplied to one of the three de-icers 10,20,30 provided in this embodiment. An electromagnetically operating valve 12,22,32 is connected in front of each de-icer 10,20,30 so that one of the de-icers can be selectively activated for regeneration, whilst a non-return valve 14, 24, 34 is connected at each output side so as to prevent the reflux of the refrigerant emerging from each de-icer.

Two of the de-icers act as refrigerators and serve to precipitate the moisture found in the surrounding air whereby a hoarfrost covering is then deposited on the de-icer during the course of time. The third de-icer is operated regeneratively if it becomes de-frosted over a certain period of time in a manner to be described below. During the operation of the apparatus the de-icers change their function which can occur either periodically, controlled for example by a time switch, or by monitoring a characteristic temperature of the de-icer such as its surface temperature. As soon as a critical time or temperature value is reached, which means that the relevant de-icer can no longer or only inadequately fulfill its precipitation function, then it is transferred to the regeneration mode whilst the de-icer regenerated up to this time again carries out its drying functions.

In the illustrated embodiment the three de-icers 10,20,30 are connected in parallel and thus have a common supply line and common discharge line.

The electromagnetically operable valves 12, 22, 32 are closed whilst the de-icers 10, 20, 30 are used for drying. When one of the de-icers 10, 20, 30 is to be defrosted after a certain length of operating time, for example the de-icer 10, then the associated valve 12 is opened so that hot-gas refrigerant emerging from the compressor 60 can pass via the common supply line to the de-icer 10 which is now undergoing regeneration. De-frosting the hoar-frost formed on the de-icer 10, with the thaw water being discharged via a separator (not shown), causes the hot-gas refrigerant to cool down. It is supplied to a collecting container 40 through the common discharge pipe of the de-icer. A temperature monitoring device 38 is preferably mounted in the discharge pipe.

The cooled liquefied hot-gas refrigerant can be used straightaway from the collecting container 40 to produce refrigeration. To this end it is supplied again to the heat exchanger 50 through a filter 44 and throttle 46.

In the pipe between the heat exchanger 50 and the compressor 60 there is a pressure monitoring device 56 which is downstream of the heat exchanger 50 and which detects and evaluates the suction pressure on the input side in front of the compressor 60. In order to stabilise the suction pressure where required a pipe opens into the pipe section between the pressure monitoring device 56 and the compressor 60. Hot-gas refrigerant can be mixed in through this pipe, controlled by a flow control unit 58 in the pipe wherein the hot-gas refrigerant branches off on the output side from the refrigerant compressed in the compressor 60.

Compressed refrigerant from the compressor 60 can furthermore be supplied to an air-brine heat exchanger 80. In this air-brine heat exchanger 80 the hot air flowing in from a compressed air compressor exchanges through the brine its heat potential with the returning cold air from the de-icer which can have a temperature down to $-30°$ C. In the case of returning gases which have a very low temperature the energy balance can even become negative—depending on the design of apparatus—which has the result that the temperature of the brine drops considerably so that in certain circumstances a massive icing up occurs on the primary side. Since this signifies a functional failure in the heat exchanger, hot-gas refrigerant is supplied for temperature control purposes through a heat exchanger provided for this purpose and after cooling down through the brine in the air-brine reservoir 80 is forced into the collecting container 40. The refrigerant can thereby be used again for the desired cooling functions.

Further pressure monitoring devices 92,94 are provided on the output side of the compressor 60 and downstream of the supply pipe to the de-icers 10,20,30 so that the operating conditions in the pipeline for the hot-gas refrigerant mixture for the compressor and in the pipeline to the air-brine reservoir 80 can be monitored. Any refrigerant which has not been diverted as hot gas passes in the main circuit into a condenser 90 and, when cooled by the ventilator 96, from the condenser 90 into the collecting container 40.

The apparatus according to the present invention represents an environmentally friendly system which makes optimum use of its inherent energy and therefore discharges less energy to the atmosphere than systems known hitherto.

We claim:

1. An apparatus for the refrigerating drying of gases, comprising:
    a compressor for receiving and compressing a refrigerant,
    a condenser for condensing compressed refrigerant received from the compressor,
    at least one heat exchanger for extracting thermal energy from a gas,
    a collecting container for condensed refrigerant from the condenser to provide a supply of the condensed refrigerant for delivery to said at least one heat exchanger.
    at least two de-icers for precipitating moisture from a gas to be dried by accumulation of the moisture as frost or ice on the de-icers,
    means for selectively supplying compressed refrigerant from the compressor to each de-icer for regeneration, and
    means for directing refrigerant discharged from the de-icers to the collecting container.

2. An apparatus as set forth in claim 1, wherein the compressor has a suction side and a discharge side, and comprising an air-brine heat exchanger having an input side connected to the discharge side of the compressor for receiving compressed refrigerant therefrom and an output side connected to the collecting container.

* * * * *